Aug. 29, 1972  D. V. HUMPHRIES  3,687,798
CORROSION RESISTANT PLASTIC COMPOSITE AND METHOD OF MAKING
Filed April 7, 1971  2 Sheets-Sheet 1

INVENTOR
Darral V. Humphries

BY Joseph J. O'Keefe
ATTORNEY

INVENTOR.
Darral V. Humphries

United States Patent Office 3,687,798
Patented Aug. 29, 1972

3,687,798
CORROSION RESISTANT PLASTIC COMPOSITE AND METHOD OF MAKING
Darral V. Humphries, Allentown, Pa., assignor to Bethlehem Steel Corporation
Continuation-in-part of abandoned application Ser. No. 853,071, Aug. 26, 1969. This application Apr. 7, 1971, Ser. No. 132,017
Int. Cl. B32b 5/16
U.S. Cl. 161—156                           21 Claims

ABSTRACT OF THE DISCLOSURE

A fiber reinforced plastic composite has two types of fibers. One type of fiber is a ferrous fiber, or a ferrous fiber having a metallic coating. The second consists of a metal having a greater electro negativity than iron, or a ferrous fiber coated with such a metal.

CROSS-REFERENCES TO RELATED APPLICATIONS

This application is a continuation-in-part of application Ser. No. 853,071, filed Aug. 26, 1969, now abandoned.

BACKGROUND OF THE INVENTION

This invention relates to metal fiber reinforced plastic composites and particularly corrosion resistant plastic metal reinforced composites and methods of making same.

Steel fiber reinforced plastic composites are very attractive technically and economically. The plastic provides lightness not attainable with metallic sheets while the fiber reinforcing provides strength unattainable with plastic alone, and greater stiffness than can be attained with glass or aluminum fiber reinforcing. If the steel fiber is in the form of very thin relatively short wires having, for example, the consistency of chopped steel wool, the steel reinforced plastic composite may be extruded or otherwise shaped by normal plastic forming machinery and the finished composite pieces may be cut to shape with ordinary hand or power woodworking tools. When the plastic is cut or abraded, the ferrous metal is exposed and tends to quickly oxidize causing unsightly and detrimental rust areas along the cut section of the composite.

SUMMARY OF THE INVENTION

The foregoing corrosion difficulties have been alleviated by the present invention. In accordance with the invention small first fibers or strips of zinc or similar metal, or ferrous fibers coated with zinc, or such similar metal, are positioned within the plastic composite adjacent to second small fibers, or strips of ferrous metal, or ferrous metal having a non-ferrous metallic coating. The first fibers or strips are positioned so that they are in electrical contact with the second fibers or strips at isolated points within the body of the composite and are exposed on the surface of the composite within approximately one eighth of an inch of the second fibers or strips to be protected from oxidation.

DESCRIPTION OF THE PREFERRED EMBODIMENTS

Figure 1:
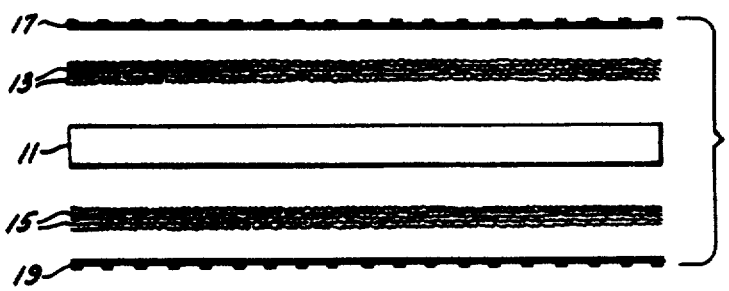
FIG. 1 is a lateral exploded view of a series of layers of materials prior to compression together to form a corrosion resistant plastic composite according to the present invention.

FIG. 1 shows a series of layers of materials for the formation of a corrosion resistant plastic composite.

A central layer of so-called A.B.S. or acrylonitrile-butadiene-styrene thermoplastic sheet 0.060 inch thick is disposed as the potential central layer 11 of the composite.

Above and below the central thermoplastic sheet layer 11 are two layers 13 and 15 of several thin sheets of steel wool mat.

Lastly above and below layers 13 and 15 are two outer layers 17 and 19 of thin strips of zinc ribbon 0.003 inch in thickness and 0.006 inch in width laid up in a square grid pattern with one eighth of an inch opening between the ribbons. If desired the strips may be interwoven to provide an easily handled screen of zinc ribbons.

Alternately, layers 13 and 15 may be ferrous alloys or a metal coated ferrous fiber. Also, layers 17 and 19 may be zinc or other sacrificial metal, or composites such as galvanized ferrous fiber or sacrificial metal alloys.

The foregoing layers may be placed within a planar compression mold of any suitable construction, not illustrated, such as is well understood in the art, where the layers are subjected to 1000 pounds per square inch pressure perpendicular to the plane of the laminate and heated for approximately fifteen minutes at 350 degrees Fahrenheit, after which the laminates are cooled in the pressure mold.

Figure 2:
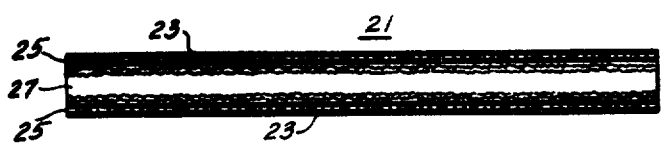
FIG. 2 is a lateral view of the materials shown in FIG. 1 composited together to form a sheet.

A laminated composite 21 as shown in FIG. 2 results from the foregoing steps. This composite has a thin external thermoplastic skin 23 of A.B.S. resin derived from the original central layer of A.B.S. resin, adjoining layers 25 comprised of A.B.S. resin, zinc ribbon and steel wool, and a central layer 27 comprised of A.B.S. resin and steel wool.

Figure 3:
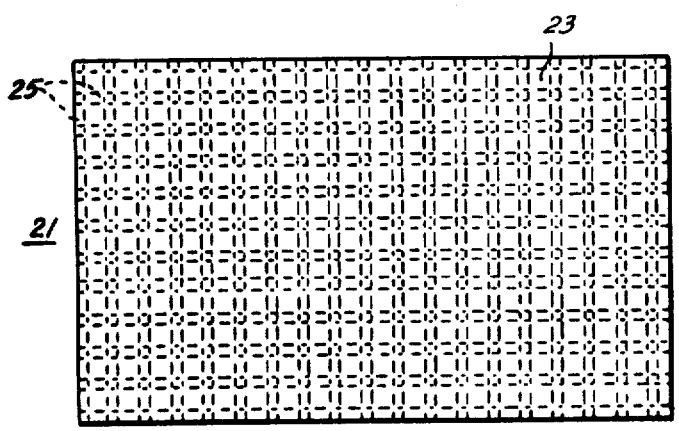
FIG. 3 shows a top view of the sheet shown in FIG. 2.

The laminate composite 21 shown in FIGS. 2 and 3 may be cut with an ordinary saw and the steel wool fibers exposed at the cut edges will show no corrosion over extended periods when exposed to extremely corrosive conditions. Composites formed identically with composite 21 with the exception that the layers 25 containing the zinc ribbon are not present will show severe corrosion along the cut edges within a very short period.

The grid pattern of the zinc ribbon containing layers 25 may be seen through the translucent plastic in FIG. 3. It will be understood that any other pattern of zinc ribbon and ferrous fibers will be equally effective so long as no ferrous fiber exposed on any surface of the composite is spaced significantly more than approximately one eighth of an inch from an adjoining zinc ribbon or fiber and so long as there is at least occasional effective electrical contact of the zinc and ferrous ribbons, wires or fibers within the composite with each other so that a galvanic corrosion couple is effectively formed. The ribbons of zinc and the steel wool in the above example are forced into effective electrical contact with each other in the composite 21 by the pressure of the molding device.

Figure 4:
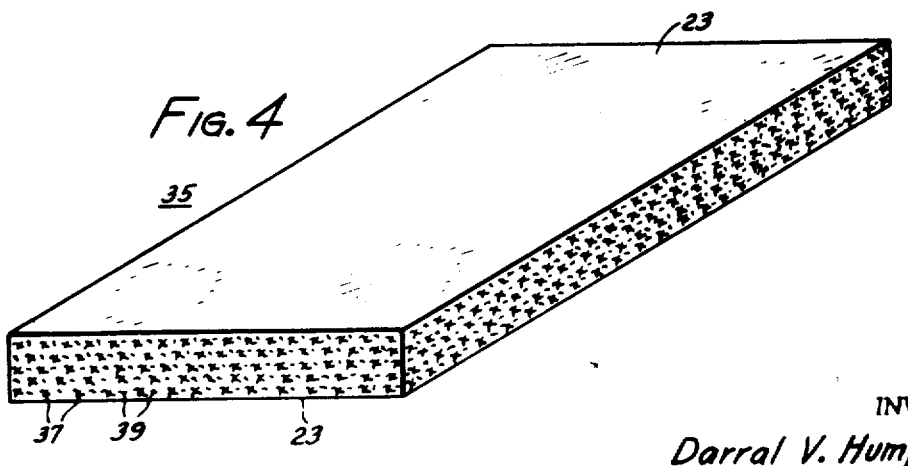
FIG. 4 is an isometric view of a second embodiment of the invention making use of a mixture of zinc wool and steel wool as the reinforcing element.

Another very desirable embodiment of the invention is shown in FIG. 4.

In FIG. 4 a thermoplastic composite 35 has been molded from polypropylene with ferrous fibers 37 disposed throughout in the form of steel wool interspersed with fibers of zinc wool 39. The relative percentages, distribution and compaction of the ferrous fibers 37 and zinc fibers 39 are such that no ferrous fiber 37 is spaced significantly more than one eighth of an inch from the nearest adjoining zinc fiber 39 and the ferrous fibers are in at least occasional effective electrical contact with the zinc fibers throughout the composite. A.B.S. thermoplastic is also very desirable as a matrix for a composite including zinc wool. The steel wool and zinc wool may be applied in separate but closely adjacent layers but are preferably mixed together prior to placing in the plastic matrix of the composite. Desirably, the steel wool and zinc wool may be manufactured together in a suitable ratio to provide a single bundle of ferrous and zinc fibers ready for use. The mixture of ferrous and zinc fibers can be either in the form of a loose mat or dry blend of short chopped ferrous and zinc fibers.

Figure 5:
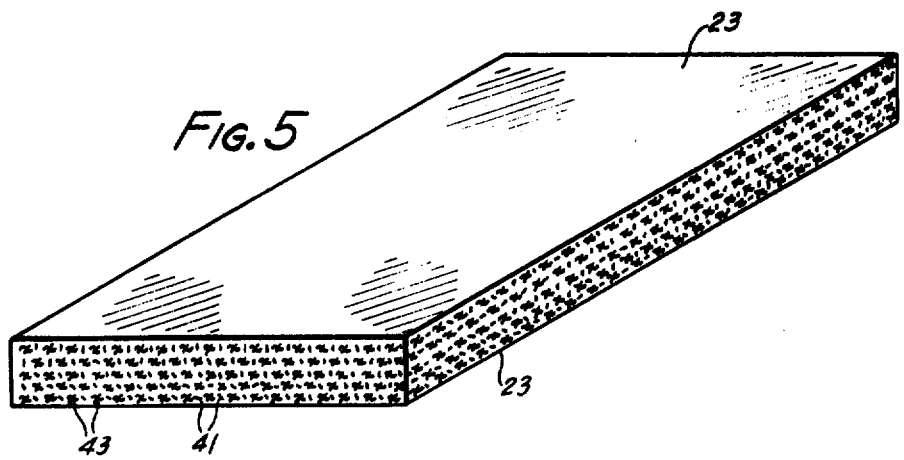
FIG. 5 is an isometric view of another embodiment of this invention.

In an alternate embodiment shown in FIG. 5, coated ferrous fibers 41 in wool form and zinc fibers 43 in wool form are interspersed in a plastic matrix. The coating on ferrous fibers 41 is a non-ferrous sacrificial or non-sacrificial, metal. The article composition is similar to FIG. 4, in which 23 is a thermoplastic resin and in which the fibers are dispersed in a manner similar to that previously described for FIG. 4.

Figure 6:
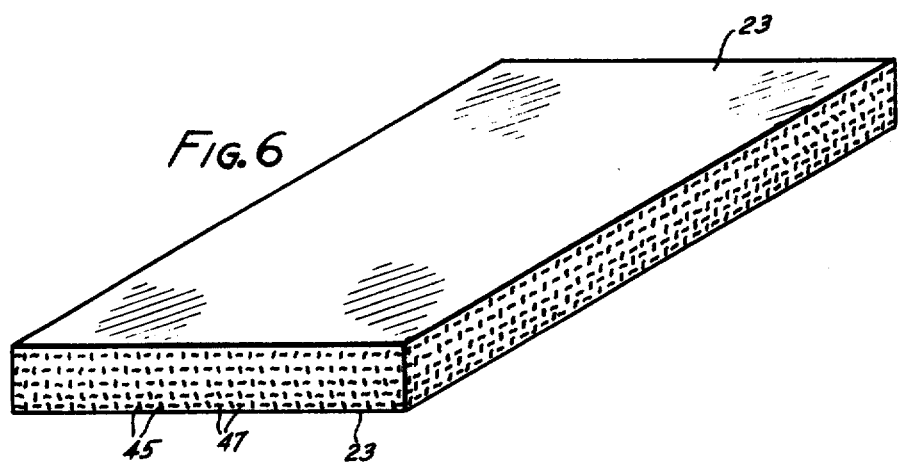
FIG. 6 shows another alternate embodiment of this invention.

In the alternate embodiment shown in FIG. 6, ferrous fibers 45 and ferrous fibers 47, coated with a sacrificial metal, e.g. zinc, are interspersed in a plastic matrix. The article composition is similar to FIG. 5 in which 23 is a thermoplastic resin and in which the fibers are dispersed in a manner similar to that previously described for FIG. 5.

As used herein, a sacrificial metal and sacrificial metal coating means a metal or a metal coating having a greater electro negativity than iron. While a non-sacrificial metal and a non-sacrificial metal coating means a metal or metal coating having an electro negativity equal to or less than that of iron.

In addition, the term ferrous fibers is meant to include a ferrous alloy fiber wherein iron is the predominant element.

While zinc is the preferable galvanic metal, the broad invention is not limited to the use of zinc, but encompasses the use of other sacrificial metals and alloys, and sacrificial metal composites having at least one metal constituent with a greater electro negativity than iron. Zinc and zinc alloys are, however, the preeminent materials for this purpose.

Other suitable plastics including thermosetting as well as thermoplastic resins will be found suitable as the matrix of the composite under appropriate circumstances. The plastic composites may be molded or otherwise formed into any desired shape in addition to the strips illustrated.

With both layered composites, such as illustrated in FIGS. 2 and 3, and uniform mixes of zinc and steel wool fibers and zinc wool, such as illustrated in FIGS. 4 and 5, are desirable for specific uses, the uniform mix type is particularly adaptable for rapid production and provides very uniform properties in the finished product. On the other hand, the layered type of composite is adaptable for the production, for instance, of composites having stiffer and harder surface layers for wear resistance, particularly if the steel wool layers are disposed adjacent the surface of the composite.

Uniform mixes can be easily prepared by mixing the proper proportions of chopped metallic wool fibers, or ribbons together wtih dry granules of the desired resin in a high speed blender of any suitable type, such as a blender having a propeller type mixing element, and then pouring the uniform dry blend into suitable molds which are subsequently heated to fuse the plastic into a matrix for the metallic fibers. The molds may be subjected to compression during or subsequent to heating to improve the density of the composite.

Alternately, blending may be separate or combined with molding of the composite in, for example, injection molding, extrusion forming or other plastic composite forming processes well known in the art.

I claim:
1. A corrosion resistant plastic composite comprising:
   (a) a matrix selected from the group consisting of thermoplastic and thermosetting resins,
   (b) thin ferrous fibers disposed throughout at least a portion of said matrix,
   (c) thin fibers of a sacrificial metal having greater electro negativity than iron disposed throughout said matrix within a distance of said ferrous fibers effective to form a galvanic corrosion couple at a cut surface and in effective electrical contact with said ferrous fibers at at least isolated points within said composite body.

2. A corrosion resistant plastic composite according to claim 1 wherein said thin fibers of sacrificial metal are comprised of zinc and the ferrous fibers are spaced within at least substantially one eighth of an inch of at least one adjoining zinc fiber.

3. A corrosion resistant plastic composite according to claim 1 wherein said thin ferrous fibers are in the form of steel wool.

4. A corrosion resistant plastic composite according to claim 2 wherein said thin ferrous fibers are in the form of a steel wool.

5. A corrosion resistant plastic composite according to claim 4 wherein said thin zinc fibers are in the form of a zinc wool.

6. A corrosion resistant plastic composite according to claim 2 in which the ferrous fibers and zinc fibers are at least partially disposed in layers in the plane of the composite.

7. A corrosion resistant plastic composite according to claim 5 in which said ferrous fibers and zinc fibers are uniformly blended together throughout the plastic matrix.

8. A corrosion resistant plastic composite according to claim 1 in which the thin ferrous fibers further comprise a thin non-ferrous, metallic coating.

9. A corrosion resistant plastic composite according to claim 8 wherein said thin fibers of sacrificial metal are comprised of zinc and the ferrous fibers are spaced within at least substantially one-eighth of an inch of at least one adjoining zinc fiber.

10. A corrosion resistant plastic composite according to claim 8 wherein said thin ferrous fibers are in the form of steel wool.

11. A corrosion resistant plastic composite according to claim 9 wherein said thin ferrous fibers are in the form of a steel wool.

12. A corrosion resistant plastic composite according to claim 11 wherein said thin zinc fibers are in the form of a zinc wool.

13. A corrosion resistant plastic composite according to claim 9 in which the ferrous fibers and zinc fibers are at least partially disposed in layers in the plane of the composite.

14. A corrosion resistant plastic composite according to claim 12 in which said ferrous fibers and zinc fibers are uniformly blended together throughout the plastic matrix.

15. A corrosion resistant plastic composite comprising:
   (a) a matrix selected from the group consisting of thermoplastic and thermosetting resins,
   (b) thin ferrous fibers disposed throughout at least a portion of said matrix,
   (c) thin ferrous fibers coated with a sacrificial metal having a greater electro negativity than iron disposed throughout said matrix within a distance of said ferrous fibers of subparagraph (b) effective to form a galvanic corrosion couple at a cut surface and in effective electrical contact with said ferrous fibers of subparagraph (b) at at least isolated points within said composite body.

16. A corrosion resistant plastic composite according to claim 15 wherein said sacrificial metal of subparagraph (c) is comprised of zinc and said ferrous fibers of subparagraph (b) are spaced within at least substantially one eighth of an inch of at least one adjoining fiber of subparagraph (c).

17. A corrosion resistant plastic composite according to claim 15 wherein said ferrous fibers of subparagraph (b) are in the form of steel wool.

18. A corrosion resistant plastic composite according to claim 16 wherein said ferrous fibers of subparagraph (b) are in the form of a steel wool.

19. A corrosion resistant plastic composite according to claim 18 wherein said fibers of subparagraph (c) are in the form of galvanized ferrous wool.

20. A corrosion resistant plastic composite according to claim 16 in which the fibers of subparagraphs (b) and (c) are at least partially disposed in layers in the plane of the composite.

21. A corrosion resistant plastic composite according to claim 19 in which the fibers of subparagraphs (b) and (c) are uniformly blended together throughout the plastic matrix.

References Cited

UNITED STATES PATENTS

| | | | |
|---|---|---|---|
| 3,041,131 | 6/1962 | Juras et al. | 161—170 |
| 3,070,871 | 1/1963 | Ryckebosch | 29—193 |
| 3,291,577 | 12/1966 | Davies | 29—191.2 |
| 3,399,160 | 8/1968 | Kemp | 117—131 |

WILLIAM J. VAN BALEN, Primary Examiner

U.S. Cl. X.R.

29—191.2, 195; 117—128.4; 161—170, 216, 217; 264—122